United States Patent [19]

Schaffer

[11] Patent Number: 4,669,802

[45] Date of Patent: Jun. 2, 1987

[54] OUTLET FOR OPTICAL FIBER CONNECTORS

[75] Inventor: Ronald R. Schaffer, Harrisburg, Pa.

[73] Assignee: AMP Incorporated, Harrisburg, Pa.

[21] Appl. No.: 844,394

[22] Filed: Mar. 26, 1986

[51] Int. Cl.[4] ............................................. H01R 13/73
[52] U.S. Cl. ..................................... 439/535; 439/536
[58] Field of Search ............... 339/122 R, 122 F, 123; 174/53, 54, 55, 56, 57, 58

[56] References Cited

U.S. PATENT DOCUMENTS

| | | | |
|---|---|---|---|
| 2,063,200 | 12/1936 | Smith | 339/122 R |
| 2,427,349 | 9/1947 | Boynton | 339/123 |
| 3,218,597 | 11/1965 | Oehlerking et al. | 339/122 R |
| 3,392,943 | 9/1968 | Baxter | 248/27 |
| 3,403,217 | 9/1968 | Drapkin | 174/53 |
| 3,865,456 | 2/1975 | Dola | 339/40 |
| 4,273,413 | 6/1981 | Bendiksen et al. | 350/96.20 |
| 4,558,172 | 12/1985 | Zetena | 339/123 |

FOREIGN PATENT DOCUMENTS 678914  7/1939  Fed. Rep. of Germany ... 339/122 R

OTHER PUBLICATIONS

IS 9136, AMP* Wall Outlet Cover Kit, by AMP Incorporated Dated May 10, 1985; pp. 1 and 2.

Primary Examiner—John McQuade
Attorney, Agent, or Firm—Gerald K. Kita

[57] ABSTRACT

An outlet 1 for optical fiber connectors 31, 31 adapted for mounting on an outlet wiring box 4 includes, a mounting bracket 2 having flat end portions 14, 14 provided with respective mounting slots 15, 15 and threaded openings 27, 27, a mounting flange 17, a strap portion 20, a nonconductive cover 3 having apertures 24, 24 aligned with respective threaded openings 27, 27, a sloped hood portion 28 of the cover 3 for resisting deflection by support against the strap portion 20 and against a projecting edge 19 of the mounting flange 17, an opening 29 in the hood portion 28 aligned with the mounting flange 17, and mounting means 30, 30 in the form of openings on the mounting flange 17 and aligned with the opening 29 of the hood portion 28 for mounting optical fiber connectors 31, 31.

7 Claims, 2 Drawing Figures

OUTLET FOR OPTICAL FIBER CONNECTORS

The invention relates to an outlet for optical fiber connectors adapted for mounting on an outlet wiring box of the common type for mounting in an interior wall of a building and for association with optical or electrical wiring concealed in the wall.

U.S. Pat. No. 3,392,943 discloses an outlet box for electrical wiring and for mounting in an interior wall of a building. The outlet box is used, for example, as an outlet wiring box, to envelop electrical wiring, thereby to avoid escape from the box of electrical sparks, and avoid the danger of electrical shock from contact with the wiring. The box has an open side for access inside to the wiring and to an electrical outlet mounted inside the box. The open side is covered by a metal or insulative cover. Only limited portions of the outlet protrude from the cover to receive a corresponding electrical plug. An example of an insulative cover is disclosed in U.S. Pat. No. 3,865,456.

An outlet box can be utilized for optical fiber cables and associated optical fiber connectors instead of for electrical wiring. Each optical fiber connector comprises, for example, an active device mount having a sleeve and a simplex connector of a fiber optic cable assembly for removable assembly with the sleeve of the active device mount. An active device mount and a removable simplex connector are disclosed in U.S. Pat. No. 4,273,413. Alternatively, the active device mount is replacedwith a single sleeve for receiving respective simplex connectors, one associated with optical fiber cable concealed in a wall of a building. An outlet is required for mounting and adapting the optical connectors with an outlet box. By way of example, an outlet for optical fiber connectors adapted for mounting on an outlet box includes, a mounting bracket provided with a mounting flange, a cover for resisting deflection by support against a projecting edge of the mounting flange, an opening in the cover aligned with the mounting flange, and mounting means on the mounting flange and aligned with the opening of the cover for mounting optical fiber connectors, the mounting means defining an access clearance space outwardly of the box for access by a human finger engaged against an optical connector mounted to the mounting means.

An object of the invention is to provide an outlet for optical fiber connectors adapted for mounting on an outlet box.

Another object of the invention is to provide an outlet for optical fiber connectors comprising, a mounting bracket having a mounting flange for mounting the connectors, and an insulative cover having a hood facing a strap portion of the bracket and a projecting edge of the mounting flange for resisting deflection by support against the strap portion and the projecting edge.

Another object of the invention is to provide an outlet for optical fiber connectors adapted for mounting on an outlet box, comprising, a mounting bracket for the optical connectors, a cover facing an outward projecting edge of the mounting bracket and a clearance space between an open side of the box and a support portion of the bracket for supporting the cover against deflection.

Another object of the invention is to provide an outlet for optical fiber connectors adapted for mounting on an outlet box, comprising a mounting bracket having mounting means for the optical connectors projecting outwardly from an open side of the box and defining an access clearance space outwardly of the box for access by a human finger engaged against an optical connector mounted to the mounting means.

Other objects and advantages of the invention are apparent from the following detailed description taken together with accompanying drawings.

DESCRIPTION OF THE INVENTION

Figure 1:
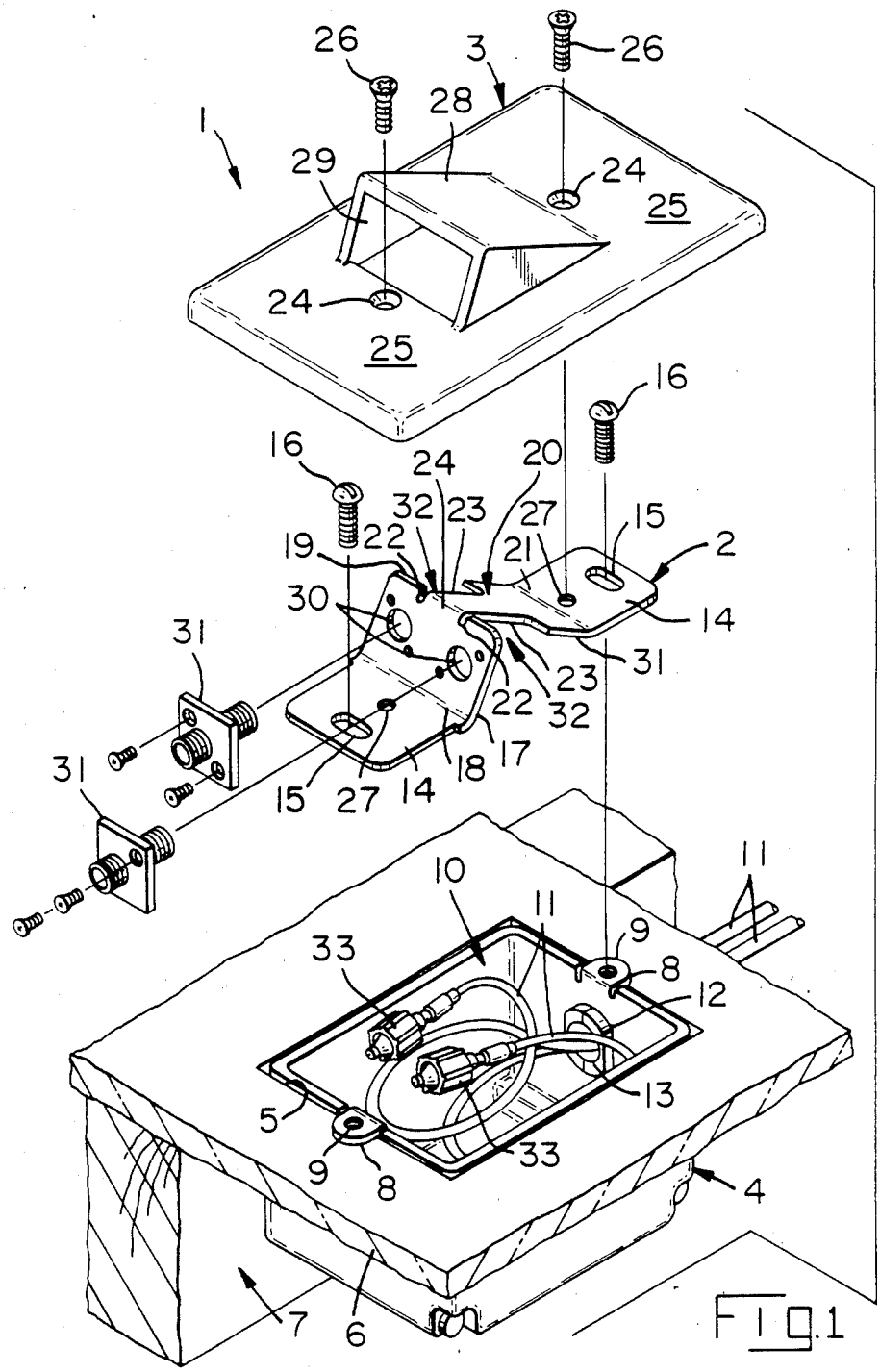
FIG. 1 of the drawings is an enlarged fragmentary perspective view of an outlet and an outlet box mounted in a wall, with parts shown exploded and the view being pivoted ninety degrees.
Figure 2:
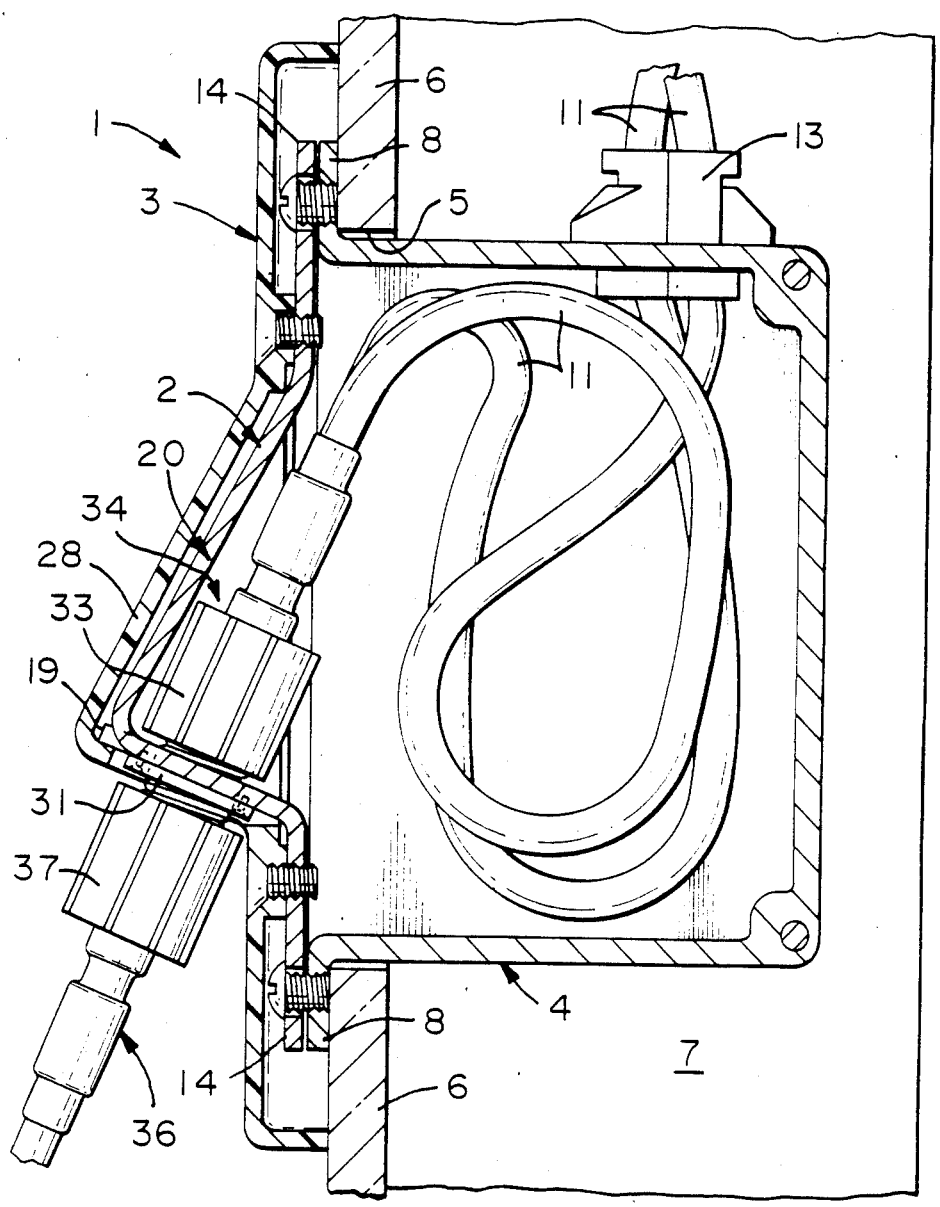
FIG. 2 is an enlarged elevation view in section of an assembly of the parts shown in FIG. 1.

With more particular reference to the drawings, by way of example, there is shown an outlet 1 for optical fiber connectors including a mounting bracket 2 and an insulative cover 3 adapted for mounting on an outlet box 4. The outlet box 4 is adapted for mounting in an opening 5 of a panel 6 that is part of an interior wall 7 of a building. Mounting flanges 8, 8 having respective threaded apertures 9, 9 are provided adjacent an open side 10 of the outlet box 4. An outlet box 4 is commonplace in the technical field of electrical wiring. One variant of an outlet box 4 is disclosed in the aforementioned U.S. Pat. No. 3,392,943. The outlet box 4 shown in the Figure is adapted for optical fiber cables 11, 11 substituted for electrical wiring. The optical fiber cables 11, 11 are routed behind the panel 6, in the hollow interior of the wall 7, and into an inlet 12 of the outlet box 4. The cables 11, 11 are anchored to the box 4 by a known clamp 13 mounted in the inlet 12. U.S. Pat. Nos. 4,216,930 and 4,021,604 disclose respective examples of a known clamp.

The bracket 2 is stamped and formed from a single piece of galvanized carbon steel 0.055 inches in thickness. Flat end portions 14, 14 of the bracket 2 are coplanar and are provided with respective slots 15, 15 for alignment with respective threaded apertures 9, 9 of the flanges 8, 8 of the outlet box 4, and for receiving threaded mounting screws 16, 16 for threaded connection with the threaded openings 9, 9. A mounting flange 17 of the bracket 2 is joined to a corresponding end portion 14 and is bent along a fold 18 and projects outwardly of the plane of the corresponding end portion 14. An outwardly projecting edge 19 of the mounting flange 17 projects outwardly from the open side 10 of the outlet box 4 to which the bracket 2 is adapted to be mounted. A strap portion 20 of the bracket is joined to a corresponding end portion 14, and is bent along a fold 21, and projects outwardly of the plane of the corresponding end portion 14 and outwardly of the open side 10 of the outlet box 4. The strap 20 is joined to the mounting flange 17 closely adjacent to the projecting edge 19. Notches 22, 22 with round edges penetrate into the projecting edge 19 of the mounting flange 17 and along respective sides 23, 23 of the strap portion 20. A fold 24 of the strap 20 begins at the notches 22, 22 and is recessed by the notches 22, 22 from the projecting edge 19 of the mounting flange 17. The projecting edge 19 and the outer surface of the strap 20 are substantially coplanar.

The insulative cover 3, for example, of unitary molded plastics, has mounting apertures 24, 24 in respective flat portions 25, 25 of the cover 3 that overlie and cover the portions 14, 14 of the mounting bracket 2. The apertures 24, 24 receive mounting screws 26, 26 for threaded connection in respective threaded openings 27, 27 of the bracket adjacent corresponding openings 15, 15 and aligned with the apertures 24, 24 of the cover 3. The cover 3 has an area that substantially covers the mounting bracket 2, the open side 10 of the outlet box 4 and the opening 5 of the wall 7. A sloped hood portion 28 of the cover 3 projects outwardly of the flat portions 25, 25 of the cover 3, and faces the strap portion 20 and the projecting edge 19 of the mounting flange 17. Deflection of the hood portion 28 will occur as a reaction to the application of impact pressure on the hood portion 28. Undesired excessive deflection is resisted by support of the hood portion 28 against the strap portion 20 and against the projecting edge 19. The hood portion 28 has an opening 29 aligned with the mounting flange 17 when the hood portion 28 is removably mounted over the bracket 2. Mounting means 30, 30 in the form of mounting apertures 30, 30 are on the mounting flange and aligned with the opening of the hood portion 28 for mounting optical fiber connectors 31, 31 of the single sleeve type, previously mentioned. The mounting means 30, 30 in the form of the apertures 30, 30 project outwardly from the open side 10 of the outlet box 4. The apertures 30, 30 are closer to the projecting edge 19 of the mounting flange 17 than to the junction of the mounting flange 17 with the corresponding end portion 14 of the bracket 2. Each side 23, 23 of the strap 20 is recessed laterally and is defined by and includes an excised area 32, 32 adjacent the mounting means 30, 30 for access by a human finger engaged against an optical connector 33 mounted to the corresponding mounting means 30, 30. An access clearance space 34, contiguous with the open side 10 of the box 4, is defined between a common plane of the flat end portions 14, 14 and the plane of the strap 20 for access by a human finger engaged against a simplex optical connector 33, 33 mounted to the corresponding connector 31, 31. A simplex connector 33, 33 is assembled to each cable 11, 11. A cable assembly 36 is associated with an item of office equipment, for example, not shown, and has a simplex connector 37 for plugging into a corresponding connector 31, thereby to couple the equipment optically with a corresponding cable 11. The outlet 1 shown and described is one example of an invention intended to be covered by the claims.

I claim:

1. An outlet for optical fiber connectors adapted for mounting on an outlet wiring box comprising, a mounting bracket having flat end portions provided with respective mounting slots for receiving mounting screws and having respective threaded openings adjacent respective slots, a mounting flange joined to and projecting outwardly of the plane of one of the end portions to a projecting edge of the mounting flange, a strap portion joined to a second of the end portions and to the mounting flange adjacent to the projecting edge, a nonconductive cover having complementary flat portions engaging and overlying the flat end portions, apertures in the flat portions aligned with respective threaded openings, a sloped hood portion of the cover projecting outwardly of the flat portions of the cover and facing the strap portion and the projecting edge for resisting deflection by support against the strap portion and against the projecting edge, an opening in the hood portion aligned with the mounting flange, and mounting means on the mounting flange and aligned with the opening of the hood portion for mounting optical fiber connectors.

2. An outlet for mounting optical fiber connectors as recited in claim 1, wherein, the projecting edge of the mounting flange has a notch adjacent each side of the strap portion.

3. An outlet for mounting optical fiber connectors as recited in claim 1, wherein, each side of the strap portion includes an excised area adjacent the mounting means.

4. An outlet for mounting optical fiber connectors as recited in claim 1, wherein, the end portions are mounted to an outlet wiring box, and the mounting flange and the strap portion project outwardly of an open side of the outlet wiring box.

5. An outlet for mounting optical fiber connectors as recited in claim 1, wherein, the mounting means is closer to the projecting edge the mounting flange than to the junction of the flange with the corresponding end portion.

6. An outlet for mounting optical fiber connectors as recited in claim 1, wherein, a clearance space is defined between a common plane of the end portions and the plane of the strap portion for access by human fingers.

7. An outlet for mounting optical fiber connectors as recited in claim 1, wherein, the mounting means projects outwardly from an open side of the outlet wiring box and an access clearance space is between a plane of the flat end portions and the plane of the strap portion for access by a human finger engaged against an optical connector body mounted to the mounting means.

* * * * *